US007764936B2

(12) United States Patent
Nakasono et al.

(10) Patent No.: US 7,764,936 B2
(45) Date of Patent: Jul. 27, 2010

(54) DUST AND WATER RESISTANT ELECTRONICS ENCLOSURE

(75) Inventors: Kenji Nakasono, Osaka (JP); Masami Segawa, Osaka (JP)

(73) Assignee: Panasonic Corporation, Osaka (JP)

( * ) Notice: Subject to any disclaimer, the term of this patent is extended or adjusted under 35 U.S.C. 154(b) by 939 days.

(21) Appl. No.: 11/387,586

(22) Filed: Mar. 23, 2006

(65) Prior Publication Data

US 2006/0256510 A1 Nov. 16, 2006

(30) Foreign Application Priority Data

May 12, 2005 (JP) ............................. 2005-139532

(51) Int. Cl.
*H04B 1/034* (2006.01)

(52) U.S. Cl. ................... 455/128; 455/575.1; 455/90.3; 361/748; 200/302.2

(58) Field of Classification Search .............. 455/550.1, 455/575.1, 575.8, 575.9, 90.3, 99, 128; 361/600, 361/748, 752, 784, 792; 341/176; 200/302.1, 200/302.2, 302.3, 512
See application file for complete search history.

(56) References Cited

U.S. PATENT DOCUMENTS 5,822,192 A * 10/1998 Hayashi ...................... 361/752
7,383,029 B2 * 6/2008 Sasaki et al. ................ 455/128
7,499,283 B2 * 3/2009 De Los Santos et al. .... 361/752

FOREIGN PATENT DOCUMENTS

JP 07-297565 11/1995
JP 09-008474 1/1997

* cited by examiner

*Primary Examiner*—Lana N Le
*Assistant Examiner*—Ping Y Hsieh
(74) *Attorney, Agent, or Firm*—RatnerPrestia

(57) ABSTRACT

An electronic device having a configuration which has an operation body formed in substantially a flat shape and in which a side wall of a lower case is brought into elastic contact with an upper case, and a switch provided on a circuit board is sealed in space formed by the circuit board, the side wall and the operation body. A flange that increases the size of the outer shape of the operation body is not required to be formed, it is possible to obtain an electronic device having dustproof and waterproof performances and having a small size.

10 Claims, 7 Drawing Sheets

DUST AND WATER RESISTANT ELECTRONICS ENCLOSURE

BACKGROUND OF THE INVENTION

1. Field of the Invention

The present invention mainly relates to a portable electronic device for locking and unlocking vehicle doors by remote control operation.

2. Background Art

In recent years, vehicles have had higher functions and been diversified, which accordingly has increased devices for locking and unlocking vehicle doors by remote control operation with the use of a transmitter using infrared rays or electric wave in addition to doors locked and unlocked directly by a key.

Electronic devices used for this purpose are often stored in a vehicle or used outside. Therefore, these transmitters are strongly required to have dustproof and waterproof properties. For example, Japanese Patent Unexamined Publication No. 7-297565 and Japanese Patent Unexamined Publication No. 9-8474 describe conventional transmitter and receiver.

However, in the case of conventional electronic devices, in order to enhance dustproof and waterproof properties, the outer shape of the device has to become larger. Therefore, it has been difficult to miniaturize such devices.

SUMMARY OF THE INVENTION

The present invention was made to solve such a conventional problem, and it is an object of the present invention to provide a transmitter that has dustproof and waterproof properties and can be miniaturized.

An electronic device of the present invention has a configuration which has substantially a flat-shaped operation body and in which a side wall of a lower case elastically presses the operation body to an upper case. In the configuration, a switch provided on a circuit board is sealed in space formed by the circuit board, the side wall and the operation body. Since a flange that makes the size of the outer shape of the operation body is not required to be formed, an electronic device having dustproof and waterproof performances and having a small size.

Additional objects and advantages of the present invention will be apparent from the following detailed description of preferred embodiments thereof, which are best understood with reference to the accompanying drawings.

DETAILED DESCRIPTION OF THE INVENTION

Firstly, a transmitter in accordance with a comparative example invented by the present inventors is described with reference to FIGS. 7 and 8.

Figure 7:
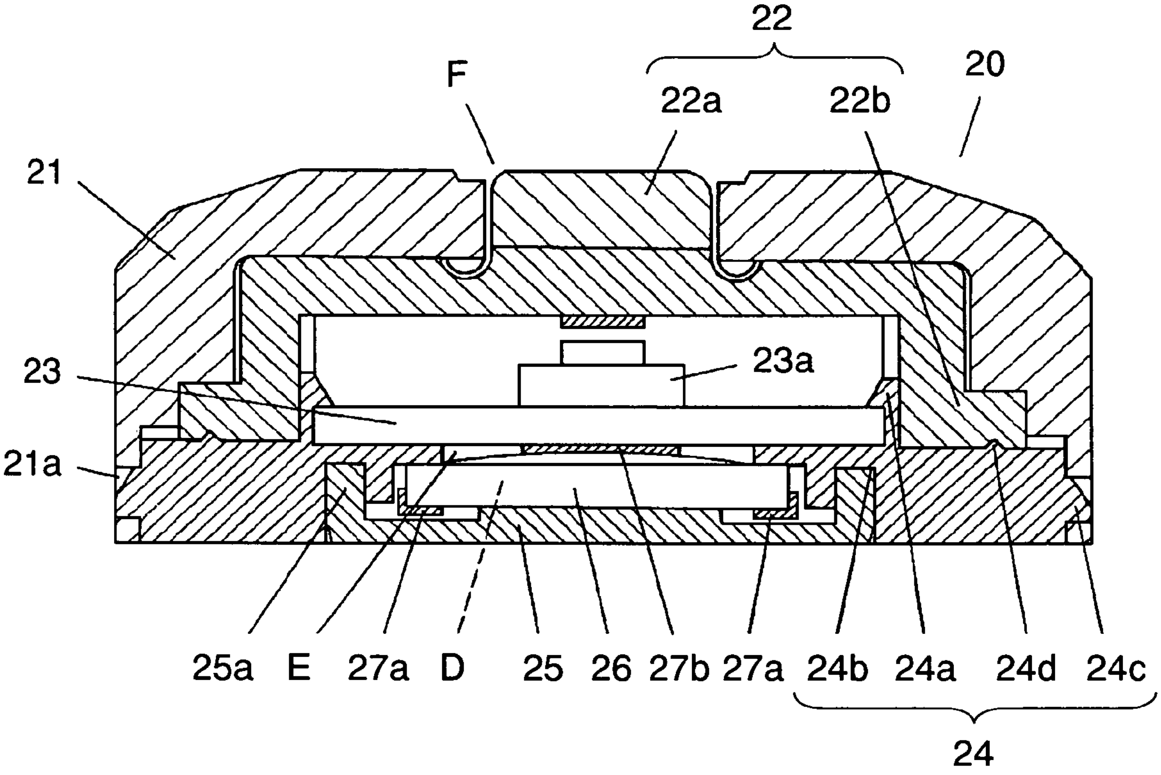
FIG. 7 is a longitudinal sectional view showing a transmitter in accordance with a comparative example.
Figure 8:
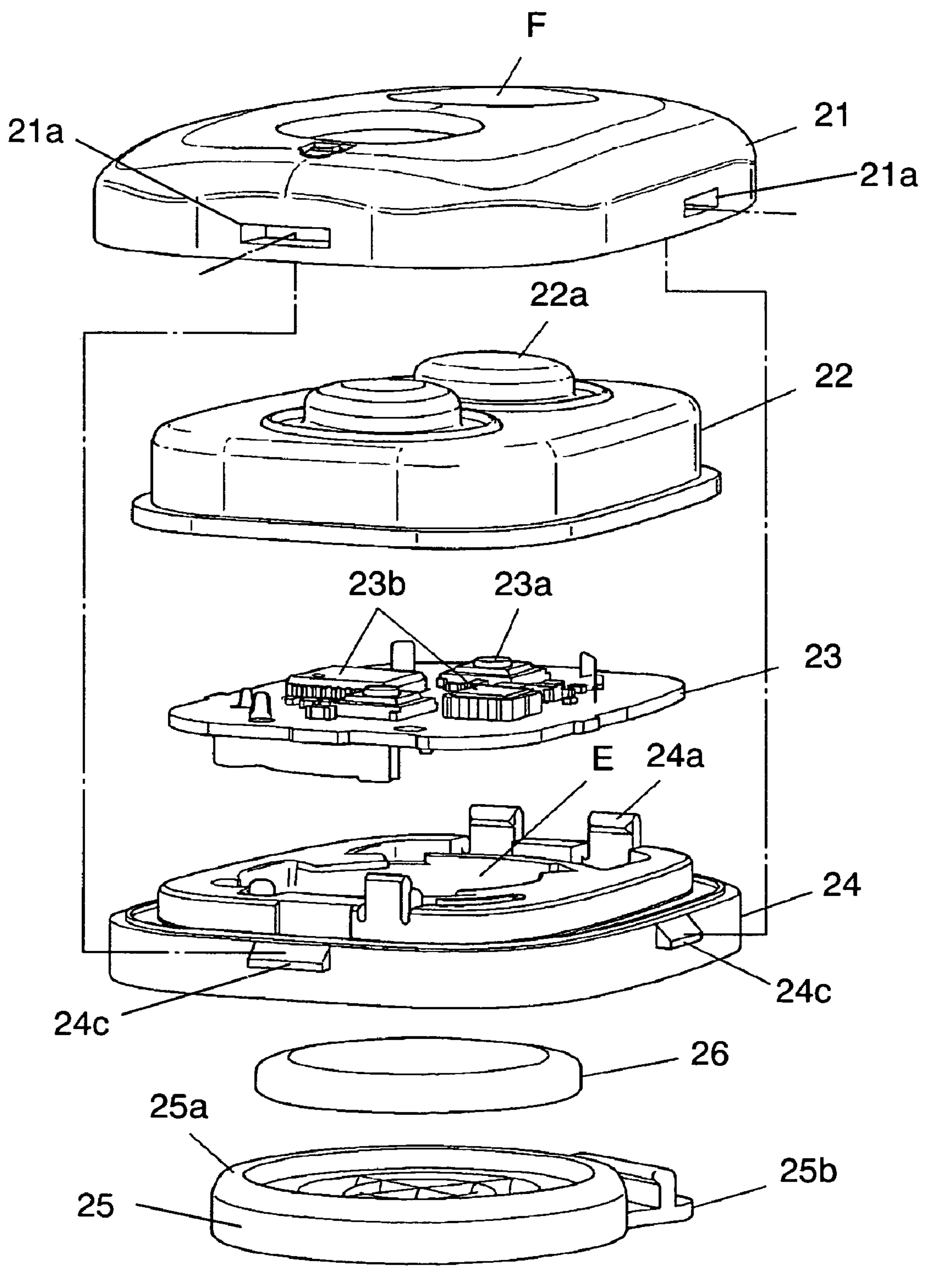
FIG. 8 is an exploded perspective view showing a transmitter in accordance with a comparative example.

FIGS. 7 and 8 are views to illustrate a transmitter in accordance with a comparative example. Transmitter 20 of a comparative example includes box-like upper case 21 having an open lower surface and dome-shaped operation body 22. Dome-shaped operation body 22 is made of an elastic material such as rubber. From through hole F provided on the upper surface of upper case 21, convex portion 22*a* provided on the upper surface of operation body 22 protrudes in a state in which convex portion 22*a* can move vertically.

Below operation body 22, circuit board 23 is disposed. On the upper surface of circuit board 23, switch 23*a* that is depressed to be operated by the lower surface of convex portion 22*a* is mounted. On the upper surface of circuit board 23, circuit portion 23*b* including mounted vibrator, semiconductor or the like, is formed.

Open lower surface of upper case 21 is covered with lower case 24. Lower case 24 includes, on the upper surface thereof, pawl member 24*a* for holding circuit board 23, and has central hole E communicating in the vertical direction.

Then, positive electrode 27*a* and negative electrode 27*b* coupled to the lower surface of circuit board 23 pass through central hole E of lower case 24 and come into contact with the outer periphery of battery 26 and the upper surface of battery 26, respectively.

To the lower surface of circuit board 23, positive electrode 27*a* and negative electrode 27*b* are coupled. Positive electrode 27*a* and negative electrode 27*b* are disposed in a way in which they can be seen from the outside direction of central hole E of lower case 24, respectively. When coin-shaped battery 26 is housed, positive electrode 27*a* is brought into contact with the outer periphery of battery 26 and negative electrode 27*b* is brought into contact with the upper surface of battery 26.

Transmitter 20 further includes lid 25 made of an elastic material such as rubber. In space D between the upper surface of lid 25 and lower case 24, battery 26 is housed. The outer peripheral shape of battery 26 is, for example, circular shape. When annular convex portion 25*a* provided on the outer periphery of lid 25 is fitted into cylindrical groove 24*b* of lower case 24, central hole E of lower case 24 is closed. In a part of the outer periphery of lid 25, grip 25*b* is provided.

Hook 24*c* (or a protrusion) of lower case 24 is latched in eye 21*a* (or a hole) of upper case 21, so that lower case 24 and upper case 21 are combined with each other, and thereby operation body 22 is sandwiched and held between upper case 21 and lower case 24. In a state in which upper case 21 and lower case 24 are combined with each other, protrusion 24*d* of lower case 24 presses flange 22*b* of operation body 22. Therefore, operation body 22 made of an elastic body is elastically pressed to upper case 21. Thus, transmitter 20 is configured as mentioned above.

In transmitter 20 mentioned above, when convex portion 22*a* of operation body 22, which protrudes from the upper surface of upper case 21, is depressed, the lower surface of convex portion 22*a* presses switch 23*a*. This operation turns switch 23*a* ON/OFF, thereby allowing circuit portion 23*b* to be operated. With circuit portion 23*b* that is operated as mentioned above, infrared ray, electric wave, or the like, is transmitted from transmitter 20 to a vehicle so as to allow locking or unlocking of doors by remote control operation.

However, in transmitter 20 of the above-mentioned comparative example, flange 22*b* needs to be provided on operation body 22 in order to obtain dustproof and waterproof properties of wiring board 23. That is to say, the outer shape of operation body 22 becomes larger in size by a part corresponding to the shape of flange 22*b*. Therefore, there is a limit to the miniaturization of transmitter 20.

The present invention relates to a transmitter having a configuration which does not include a flange that has limited to the miniaturization of a transmitter of the above-mentioned comparative example and which satisfies the requirements of waterproof and dustproof properties as well as miniaturization at the same time.

Hereinafter, the embodiment of the present invention is described with reference to FIGS. 1 to 6.

EMBODIMENT

Figure 1:
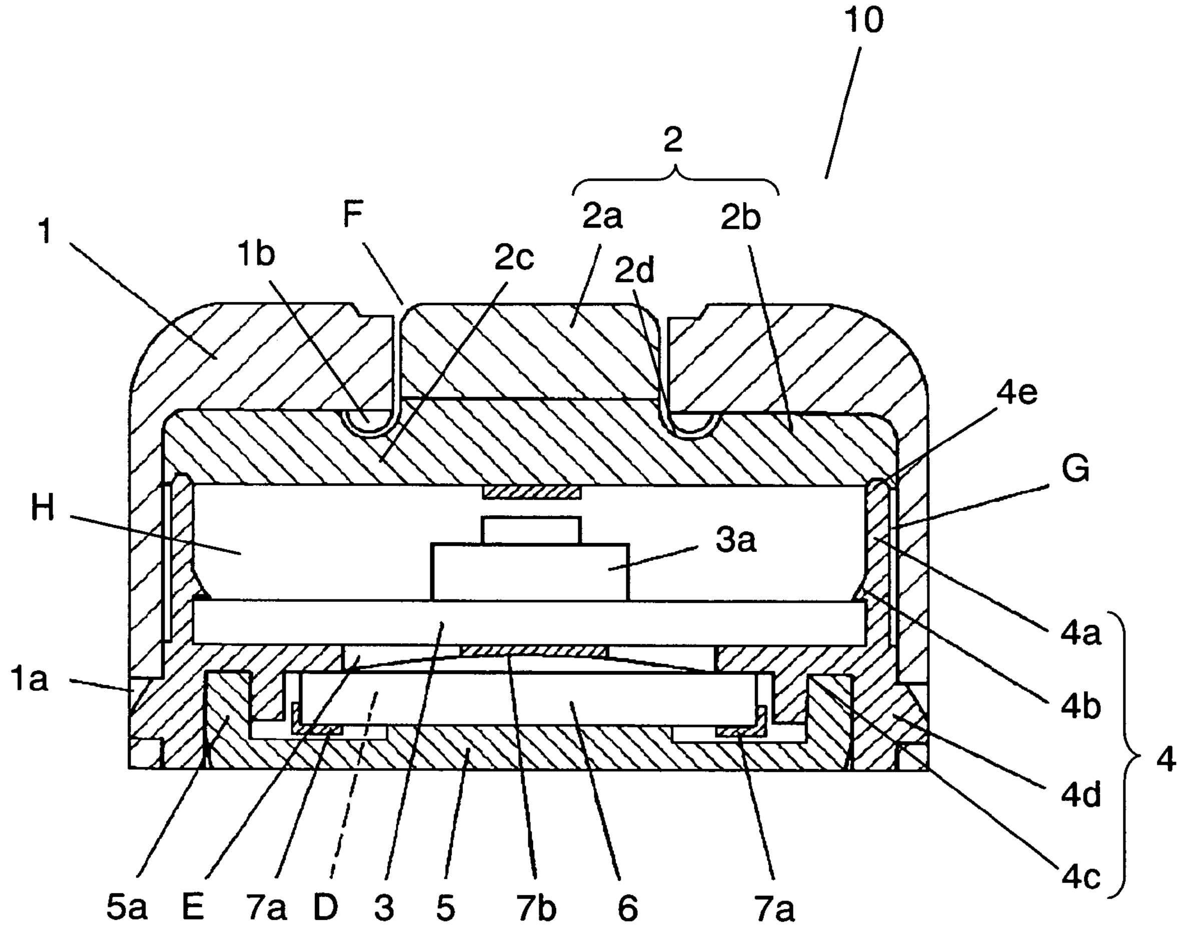
FIG. 1 is a longitudinal sectional view showing a transmitter in accordance with an embodiment of the present invention.
Figure 2:
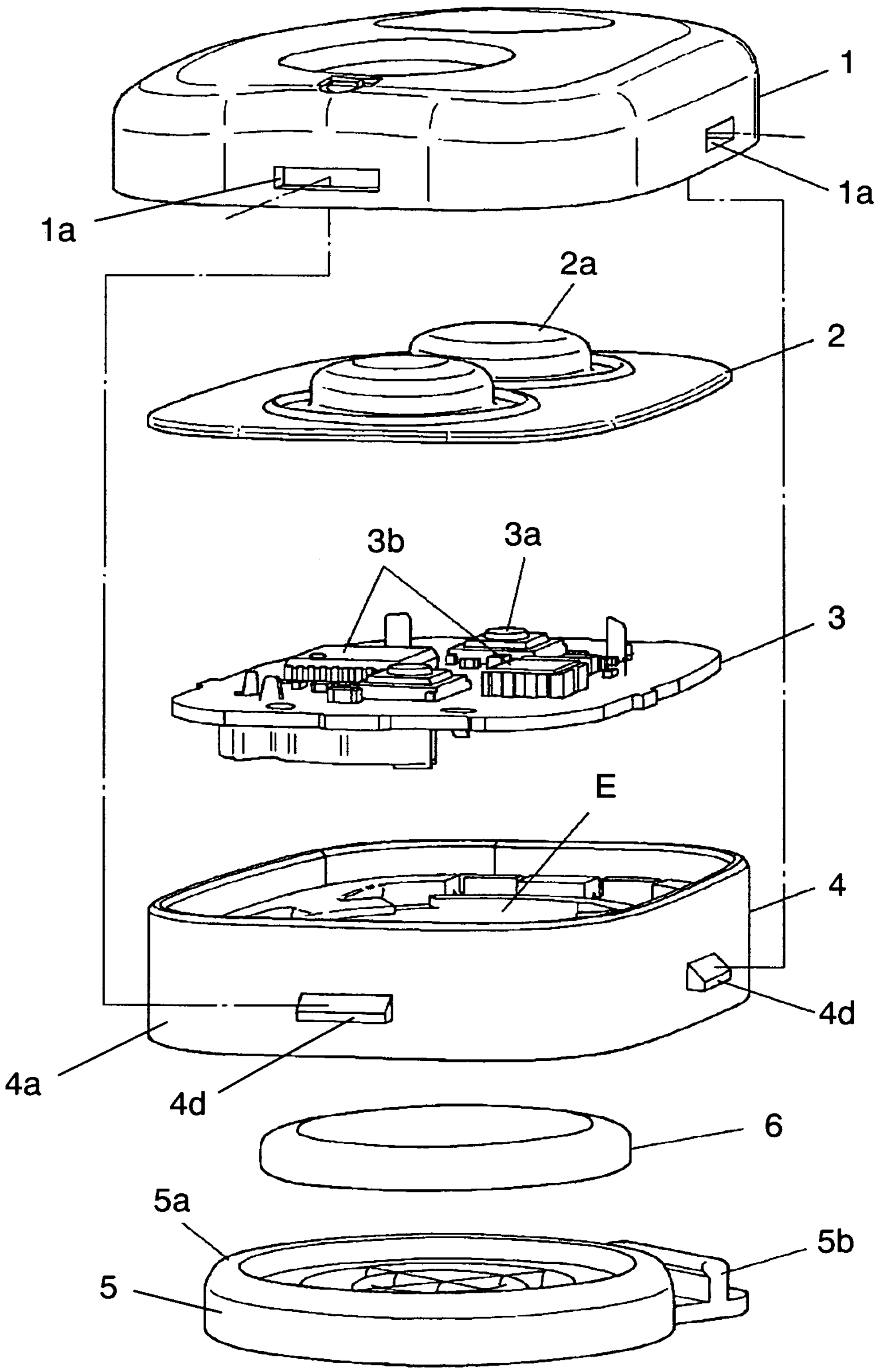
FIG. 2 is an exploded perspective view showing a transmitter in accordance with an embodiment of the present invention.
Figure 3:
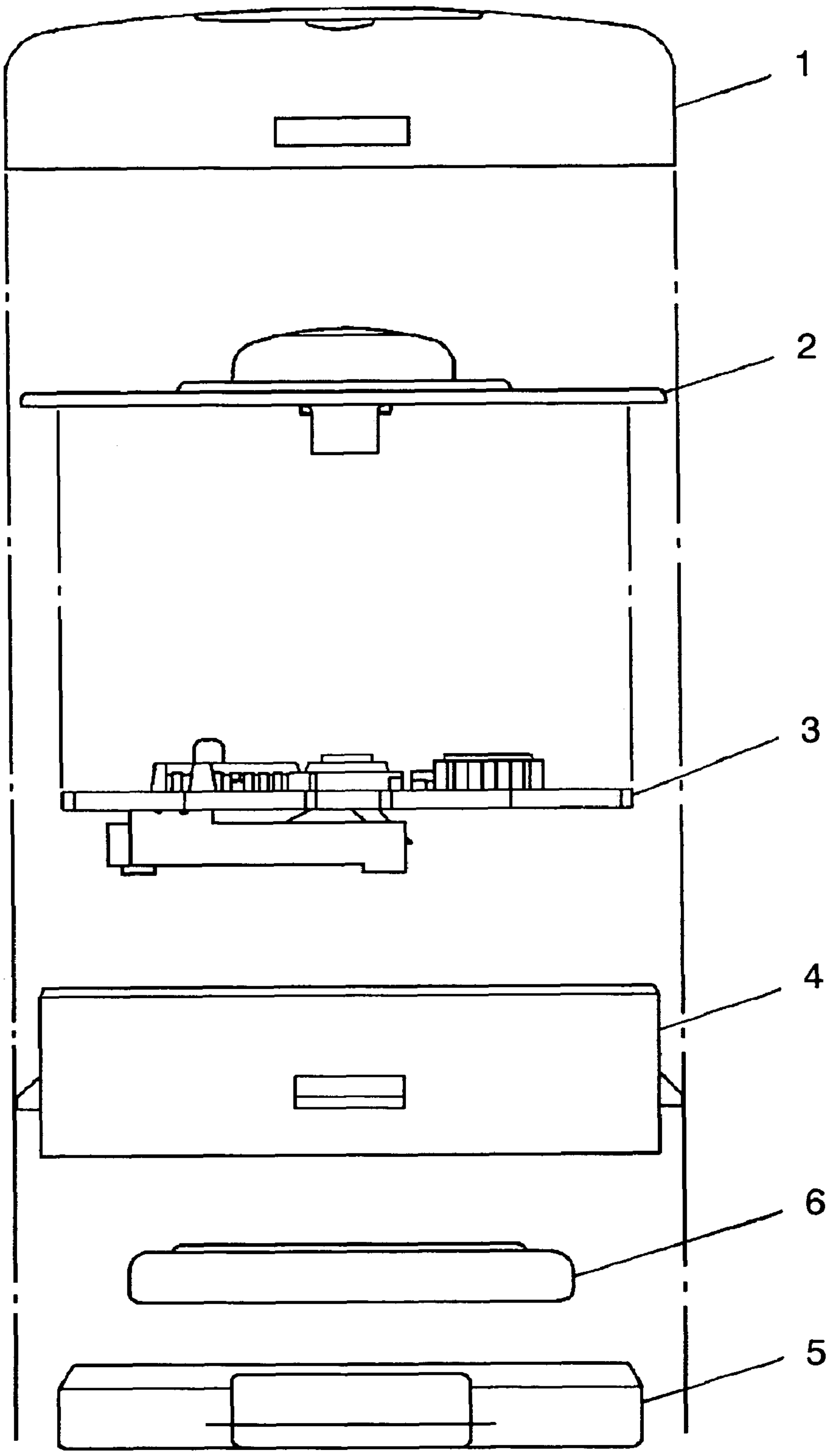
FIG. 3 is an exploded side view showing a transmitter in accordance with an embodiment of the present invention.

FIGS. 1 to 3 are views to illustrate transmitter 10 in accordance with an embodiment of the present invention. The same reference numerals may be given to the same elements as those in the comparative example, and description therefore may be simplified.

Transmitter 10 includes substantially box-like upper case 1 having an open lower surface and substantially flat-shaped operation body 2. From through hole F provided on the upper surface of upper case 1, convex portion 2*a* provided on the upper surface of operation body 2 protrudes in a state in which convex portion 2*a* can move vertically. Substantially box-like upper case 1 is a molded product made of insulating resin with excellent heat resistance, for example, ABS (acrylonitrile butadiene styrene resin), PBT (polybutylene terephthalate resin), and the like. Operation body 2 includes convex portion 2*a* made of insulating resin and linear portion 2*b* made of silicone rubber or elastomer. Linear portion 2*b* has dented thin-thickness portion 2*c* around convex portion 2*a*. Thin-thickness portion 2*c* facilitates a pressing operation of convex portion 2*a*. Furthermore, upper case 1 has bump 1*b* protruding downward in the periphery of through hole F. The shape of bump 1*b* is formed corresponding to the shape of dent 2*d* of thin-thickness portion 2*c*. Bump 1*b* is fitted into dent 2*d* of thin-thickness portion 2*c*, thereby improving the dustproof effect at the time of operation and reinforcement effect of thin-thickness portion 2*c*.

Note here that convex portion 2*a* and linear portion 2*b* of operation body 2 may be formed integrally by the same rubber material.

On the upper surface of circuit board 3 disposed below operation body 2, switch 3*a* to be depressed by the lower surface of convex portion 2*a* is mounted, and circuit portion 3*b* including mounted vibrator, semiconductor, or the like, is formed.

Open lower surface of upper case 1 is covered with lower case 4. Lower case 4 is provided with box-like side wall 4*a* extending upward. In side wall 4*a*, circuit board 3 is held by pawl member 4*b*. Furthermore, lower case 4 is provided with central hole E communicating in the vertical direction.

Note here that, positive electrode 7*a* and negative electrode 7*b* are coupled to the lower surface of circuit board 3. Positive electrode 7*a* and negative electrode 7*b* are disposed in a way in which they can be seen from the outside direction of central hole E of lower case 4, respectively. Coin-shaped battery 6 is housed, positive electrode 7*a* is brought into contact with the outer periphery of battery 6 and negative electrode 7*b* is brought into contact with the upper surface of battery 6.

Furthermore, lid 5 made of elastic materials such as silicone rubber or elastomer has annular convex portion 5*a* at the outer periphery of lid 5. Convex portion 5*a* is fitted into cylindrical groove portion 4*c* of lower case 4, and central hole E of lower case 4 is closed.

Herein, the original function of lid 5 is to secure waterproof and dustproof properties by fitting lid 5 into cylindrical groove portion 4*c* of lower case 4. Note here that battery 6 is held by an end portion of L-letter shaped positive electrode 7*a* (a flat portion at the lower side of battery 6 in FIG. 1), and is urged to the side of negative electrode 7*b* by positive electrode 7*a*.

Note here that battery 6 may be urged by using lid 5. When minute vibration occurs because of drop or vibration of transmitter 10, positive electrode 7*a* and negative electrode 7*b* may be deformed or worn out. In extreme cases, conduction failure may occur. Since the effect of minute vibration applied to battery 6 can be made smaller than a conventional case by allowing lid 5 to urge battery 6, the above-mentioned problems can be prevented.

Housed battery 6 is coupled to circuit portion 3*b* provided on circuit board 3 via positive electrode 7*a* and negative electrode 7*b*. Furthermore, grip 5*b* provided on a part of the outer periphery of lid 5 facilitates attachment/detachment of lid 5.

Furthermore, hook (or a protrusion) 4*d* of lower case 4 is latched in eye (or an opening hole) 1*a* that opens in the lower part of the side surface of upper case 1, and thereby upper case 1 and lower case 4 are combined with each other. Operation body 2 is sandwiched to be held between the combined upper case 1 and lower case 4. Top portion 4*e* formed in a convex shape on side wall 4*a* of lower case 4 presses linear portion 2*b* upward, and thereby linear portion 2*b* made of an elastic body is brought into elastic contact with upper case 1.

According to the above-described configuration, space H formed by circuit board 3, operation body 2 and side wall 4*a* is held in a sealed state.

That is to say, transmitter 10 in accordance with this embodiment does not need flange 22*b* that was needed in transmitter 20 of a comparative example and operation body 2 is formed in substantially a flat shape, thereby reducing the dimension of the outer shape of transmitter 10. At the same time, operation body 2 is pressed against upper case 1 by top portion 4*e* of side wall 4*a* so as to secure the dustproof and waterproof properties of space H in side wall 4*a* in which circuit board 3 is housed.

In transmitter 10 in accordance with this embodiment, when convex portion 2*a* of operation body 2 protruding from the upper surface of upper case 1 is depressed, the lower surface of convex portion 2*a* presses switch 3*a*. With this operation, switch 3*a* is turned ON/OFF, thereby allowing circuit portion 3*b* to be operated. When circuit portion 3*b* is operated, infrared ray, electric wave, or the like, is sent from transmitter 10 to a vehicle. As a result, locking or unlocking of doors of the vehicle can be carried out by remote control operation.

Thus, according to this embodiment, by forming operation body 2 in substantially a flat shape and by bringing linear portion 2*b* of operation body 2 into elastic contact with upper case 1 by the use of side wall 4*a* of lower case 4, flange 22*b* and the like may be excluded from operation body 2. As a result, it is possible to obtain transmitter 10 capable of achieving excellent dustproof and waterproof properties and miniaturization at the same time.

By forming top portion 4*e* of side wall 4*a* of lower case 4 in a convex shape, elastic contact power between operation body 2 and upper case 1 is increased, thereby realizing more reliable dustproof and waterproof properties.

Figure 4:
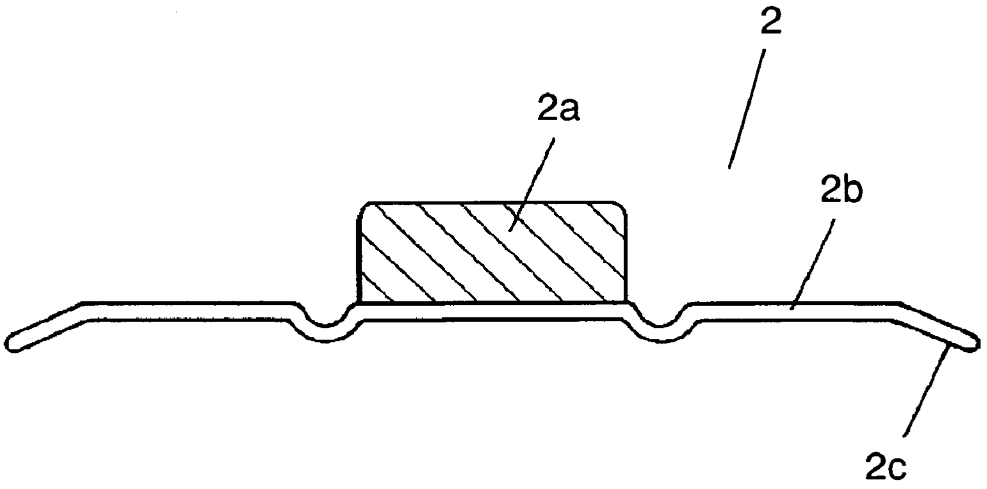
FIG. 4 is a longitudinal sectional view showing an operation body in accordance with another embodiment of the present invention.

Note here that in the above description, operation body 2 is an elastic body made of a rubber material and the like. Instead of elastic body, as shown in FIG. 4, by using a metal material having a spring property, the end of linear portion 2*b* is bent downward and this elastic bent portion 2*c* may be formed so that it is brought into elastic contact with side wall 4*a* of lower case 4. Also with the configuration shown in FIG. 4, an effect capable of realizing dustproof and waterproof properties and short length can be obtained.

Figure 5:
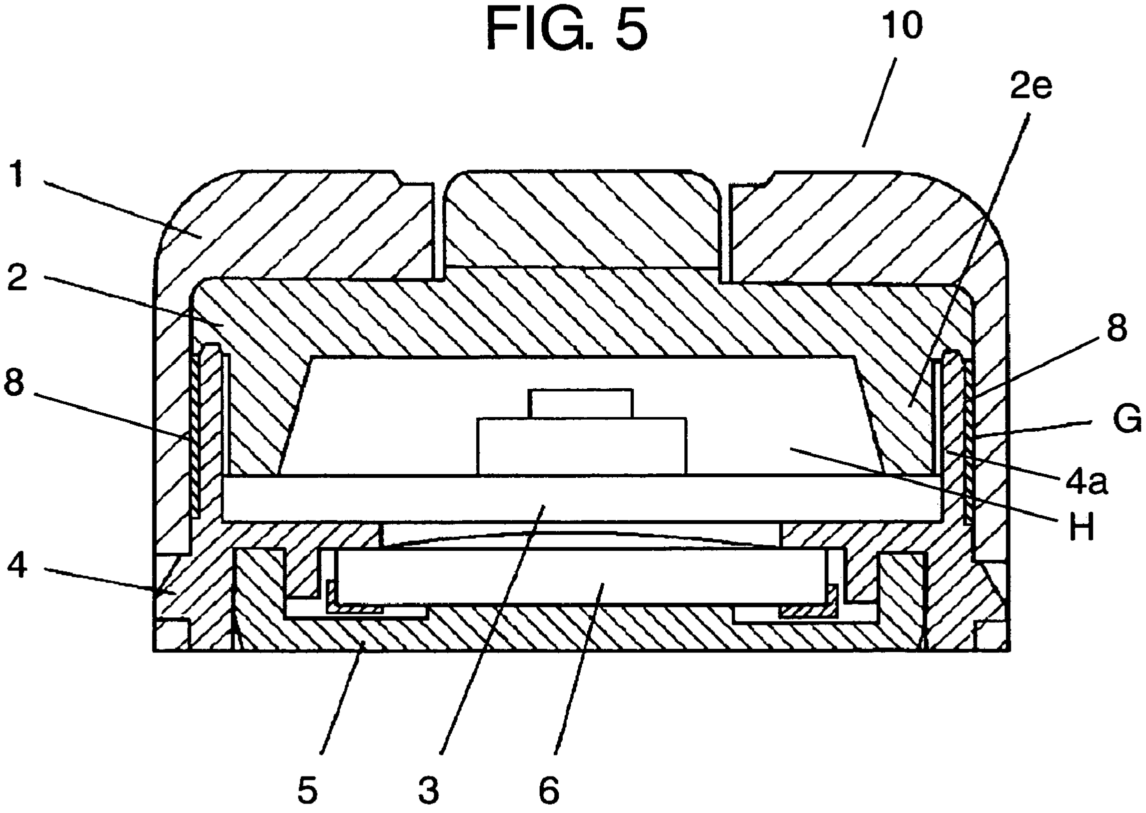
FIG. 5 is a longitudinal sectional view showing a transmitter in accordance with another embodiment of the present invention.

Furthermore, as shown in FIG. 5, support portion 2*e* that is a downward protruding portion having a height reaching circuit board 3 may be provided on the lower surface of operation body 2. With the configuration shown in FIG. 5, dustproof and waterproof properties can be further enhanced. Furthermore, pawl member 4*b* for holding circuit board 3 provided on side wall 4*a* of lower case 4 is not needed, thereby facilitating the assembly.

Furthermore, as shown in, for example, FIG. 5, filling material 8 may be filled in space G between the outer periphery of side wall 4*a* and the inner periphery of upper case 1. Filling material 8 is used for the purpose of improving a sealing property of space H. Preferably, filling material 8 is resin that is solid in the range of working temperature. For example, thermosetting synthetic resin such as silicone resin, epoxy resin, unsaturated polyester resin, and the like, can be used. Furthermore, thermoplastic resin such as acrylic resin, rosin, and the like, may be heated and filled, followed by cooling. The use of such filling material 8 can enhance dustproof and waterproof properties.

Figure 6:
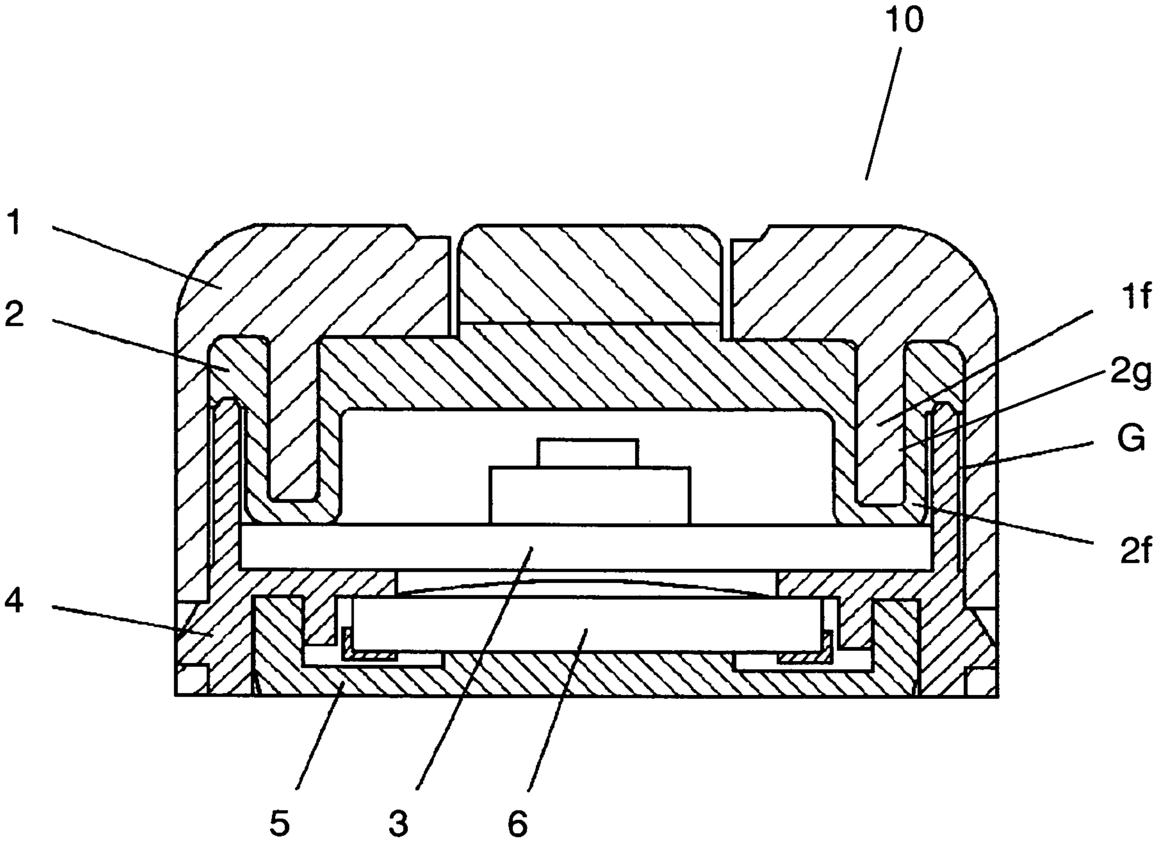
FIG. 6 is a longitudinal sectional view showing a transmitter in accordance with another embodiment of the present invention.

Furthermore, as shown in FIG. 6, concave portion 2*g* is provided on support portion 2*f* that is brought into contact with circuit board 3 and this concave portion 2*g* may be fitted into downward protrusion if provided in upper case 1. With the configuration shown in FIG. 6, dustproof and waterproof properties can be further improved. In addition, pawl member 4*b* of lower case 4 is not needed, and operation body 2 and upper case 1 can be constructed independently, thereby facilitating the assembly.

In the embodiment explained above, transmitter 10 has one switch 3*a* in a substantially center position. Transmitter 10 can have a plurality of switches 3*a* in sealed space and in a position other than the center position.

Note here that in the embodiment mentioned above, an electronic device of the present invention is described on a transmitter for a vehicle. An electronic device of the present invention is not limited to a transmitter for a vehicle. The same effect can be obtained in the case where the electronic device of the present invention is used for remote control transmitters for carrying out remote control operation of various electronic apparatuses, portable receiver, portable game machine, portable telephone, or the like. For example, when the electronic device of the present invention has further an antenna and a circuit portion is provided with a receiving circuit, it can be used as a receiving device or a transmitting/receiving device.

It will be obvious to those skilled in the art that various changes may be made in the above-described embodiments of the present invention. However, the scope on the present invention should be determined by the following claims.

What is claimed is:

1. An electronic device comprising:

an upper case having a side surface and an upper surface provided with a through hole;

a lower case having, on the periphery thereof, a side wall extending in the direction of the upper case and covering a lower surface of the upper case, a top portion of the side wall comprising a convex-shaped surface;

a substantially flat-shaped operation body having a convex portion housed in the upper case, the convex portion protruding from the through hole;

a circuit board housed between the operation body and the lower case; and a switch mounted on the circuit board and below the convex portion;

wherein the convex-shaped surface of the side wall extends above the circuit board and elastically presses the operation body upward against the upper case, and the switch is sealed in a space formed by the circuit board, the side wall and the operation body, and the operation body has a portion operable to contact the switch to depress the switch, and a space is provided between an outer circumferential surface of the side wall of the lower case and an inner circumferential surface of the side surface of the upper case, and substantially no portion of the operation body extends into the space between the outer circumferential surface of the side wall of the lower case and the inner circumferential surface of the side surface of the upper case.

2. The electronic device of claim 1, wherein at least a part of the operation body, which is brought into contact with the upper surface of the upper case, is an elastic body.

3. The electronic device of claim 1, wherein a filling material is filled in the space between the outer circumferential surface of the side wall of the lower case and the inner circumferential surface of the side wall of the upper case.

4. The electronic device of claim 1, wherein the operation body has, on the periphery thereof, a downward protruding portion having a height reaching the circuit board.

5. The electronic device of claim 4, wherein the upper case has a downward protrusion extending downward from the upper surface;

the operation body has a concave portion formed inside the downward protruding portion; and the downward protrusion is fitted into the concave portion.

6. The electronic device of claim 1, further comprising a circuit portion to be mounted on the circuit board, wherein the circuit portion is sealed in the space.

7. The electronic device of claim 6, further comprising a lid below the lower case, wherein the lower case is provided with opening; a battery is housed between the lid and the lower case; and the circuit portion is coupled to the battery.

8. The electronic device of claim 1, wherein the operation body has a dented thin-thickness portion around the convex portion.

9. The electronic device of claim 8, wherein the upper case has a bump protruding downward around the through hole and the bump is fitted into a dent of the thin-thickness portion.

10. The electronic device of claim 1, wherein the substantially flat-shaped operation body further comprises a substantially flat lower surface, a periphery of the substantially flat lower surface comprises a mating surface, and the convex-shaped surface of the side wall mates with the mating surface of the substantially flat lower surface of the operation body to elastically press the operation body against the upper case.

* * * * *